(12) United States Patent
Mason et al.

(10) Patent No.: US 9,779,225 B2
(45) Date of Patent: Oct. 3, 2017

(54) METHOD AND SYSTEM TO PROVIDE ACCESS TO SECURE FEATURES OF A DEVICE

(71) Applicant: Google Inc., Mountain View, CA (US)

(72) Inventors: J. Eric Mason, Mountain View, CA (US); Kenneth Louis Herman, San Jose, CA (US); Yash Modi, San Mateo, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/681,868

(22) Filed: Apr. 8, 2015

(65) Prior Publication Data

US 2016/0300048 A1    Oct. 13, 2016

(51) Int. Cl.
*G06F 21/31* (2013.01)

(52) U.S. Cl.
CPC .................................. *G06F 21/31* (2013.01)

(58) Field of Classification Search
CPC ............................. G06F 21/316; G06F 21/31
See application file for complete search history.

(56) References Cited

U.S. PATENT DOCUMENTS

| | | | |
|---|---|---|---|
| 6,509,847 B1 | 1/2003 | Anderson | |
| 6,549,792 B1 | 4/2003 | Cannon et al. | |
| 8,819,812 B1* | 8/2014 | Weber | G06F 3/017 726/18 |
| 2001/0047488 A1* | 11/2001 | Verplaetse | G06F 21/32 726/5 |
| 2007/0186192 A1 | 8/2007 | Wigdor | |
| 2010/0164897 A1 | 7/2010 | Morin et al. | |
| 2010/0234074 A1 | 9/2010 | Keski-Jaskari | |
| 2011/0187497 A1* | 8/2011 | Chin | H04L 9/32 340/5.54 |
| 2012/0023573 A1* | 1/2012 | Shi | G06F 3/04883 726/17 |
| 2012/0035881 A1 | 2/2012 | Rubin et al. | |

(Continued)

FOREIGN PATENT DOCUMENTS

| | | |
|---|---|---|
| EP | 2302881 A1 | 3/2011 |
| WO | 0156256 A2 | 8/2001 |
| WO | 2014051961 A2 | 4/2014 |

OTHER PUBLICATIONS

Bakar et al.,Adaptive authentication based on analysis of user behavior, Aug. 2014, Science and Information Conference (SAI), IEEE, p. 601-606.*

(Continued)

*Primary Examiner* — Luu Pham
*Assistant Examiner* — Harvey Cohen
(74) *Attorney, Agent, or Firm* — Morris & Kamlay LLP (57) ABSTRACT

A method of providing access to secure features of a device includes detecting motion of a secured device during entry of first access credentials on the secured device, storing first motion data in association with the first access credentials, the first motion data indicating a pattern of the detected motion, and granting access to a secured feature of the secured device when a user enters user access credentials matching the first access credentials accompanied by detected motion that produces user motion data matching the first motion data to a degree within a defined valid data range of the first motion data.

26 Claims, 6 Drawing Sheets

(56) References Cited

U.S. PATENT DOCUMENTS

| | | | | |
|---|---|---|---|---|
| 2013/0106686 A1* | 5/2013 | Bennett | ............... | G06F 3/017 |
| | | | | 345/156 |
| 2013/0265218 A1* | 10/2013 | Moscarillo | ............ | G06F 3/017 |
| | | | | 345/156 |
| 2014/0059673 A1* | 2/2014 | Azar | ............... | G06F 21/32 |
| | | | | 726/19 |
| 2014/0109010 A1* | 4/2014 | Casey | ............... | G06F 21/31 |
| | | | | 715/835 |
| 2014/0160003 A1* | 6/2014 | Follis | ............... | G06F 1/1694 |
| | | | | 345/156 |
| 2014/0310764 A1* | 10/2014 | Tippett | ............... | G06F 21/31 |
| | | | | 726/1 |
| 2015/0154394 A1* | 6/2015 | Kapinos | ............ | G06F 21/31 |
| | | | | 726/19 |
| 2015/0371023 A1* | 12/2015 | Chen | ............... | G06N 99/005 |
| | | | | 706/12 |
| 2016/0050308 A1* | 2/2016 | Liu | ............... | H04W 52/0209 |
| | | | | 455/411 |

OTHER PUBLICATIONS

Islam et al, A biometrics-based secure architecture for mobile computing, 2012, Systems, Applications and Technology Conference (LISAT), 2012 IEEE Long Island.*

Iwasaki et al., Expressive typing: a new way to sense typing pressure and its applications, Apr. 2009, ACM, Apr. 2009 CHI EA '09: CHI '09 Extended Abstracts on Human Factors in Computing Systems, p. 4369-4374.*

Manabe et al., AwareLESS authentication: insensible input based authentication, ACM Apr. 2007 CHI EA '07: CHI '07 Extended Abstracts on Human Factors in Computing Systems, p. 2561-2566.*

* cited by examiner

METHOD AND SYSTEM TO PROVIDE ACCESS TO SECURE FEATURES OF A DEVICE

BACKGROUND

Many devices utilize input of a personal identification number (PIN) on a physical or virtual keypad as a security measure to control access to, for example, the device itself or to a system or mechanism that the device controls, such as a lock or a home security system. In some cases, the device may actuate physical taps by the user of one or more buttons on the keypad into electrical signals that may be used to identify which button(s) was tapped. The PIN may be viewed as a sequence of signals required as a code to unlock the secured measure. However, the PIN may be compromised in various ways, leading to a security flaw in the device.

BRIEF SUMMARY

According to an embodiment of the disclosed subject matter, a method of providing access to secure features of a device includes detecting motion of a secured device during entry of first access credentials on the secured device, storing first motion data in association with the first access credentials, the first motion data indicating a pattern of the detected motion, and granting access to a secured feature of the secured device when a user enters user access credentials matching the first access credentials accompanied by detected motion that produces user motion data matching the first motion data to a degree within a defined valid data range of the first motion data.

According to an embodiment of the disclosed subject matter, a device having a secured feature designated to be accessible only to authorized users is provided, the device including a movement detector, a memory that stores computer executable components, and a processor that executes computer executable components stored in the memory, including a credentials component to receive an input of access credentials from a user, a motion data component to generate motion data from movements of the device detected by the movement detector during entry of the access credentials, and an access component to determine whether the user is an authorized user based on the inputted access credentials and the generated motion data and to deny access to the secured feature when the user is not an authorized user.

According to an embodiment of the disclosed subject matter, means for detecting motion of a secured device during entry of first access credentials on the secured device, storing first motion data in association with the first access credentials, the first motion data indicating a pattern of the detected motion, and granting access to a secured feature of the secured device when a user enters user access credentials matching the first access credentials accompanied by detected motion that produces user motion data matching the first motion data to a degree within a defined valid data range of the first motion data are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

As a security measure for a target device, PIN entry via a keypad may suffer from several potential flaws. For example, the PIN may be inadvertently compromised or surreptitiously discovered by third parties. Various measures exist to strengthen security in addition to the use of a PIN, such as, for example, requiring multiple means of verification including biometrics, tokens, and the like. However, such measures often rely on an underlying technology similar to PIN entry, that is, a code in the form of a sequence of one or more signals received by a processor to verify that the user entering the code is an authorized user who should be permitted access to the secured features. In some instances, security measures such as PINs, biometrics and tokens may be bypassed entirely by a skilled, savvy unauthorized user (e.g., hacker) who attempts to communicate directly with the device system electronically and simulate entry of the correct code or signal to gain access. It may be possible, for example, to hack a PIN-protected system by using software exploits, code injection, brute-force attacks or mathematically complex password guessing schemes.

By using a motion detecting device installed in the target device according to the embodiments disclosed herein, a user profile having a credential aspect and a motion data aspect may be used as an additional security layer for the target device. For example, a user profile may include a record of not only the user's PIN or password, but also the movements and vibrations detected by the device during entry of the PIN or password by the device. The device may then provide access to secured functions or portions of the device upon receiving entry of a correct PIN or password, in combination with detected movements that match or substantially match those in the user's profile. Embodiments disclosed herein may provide an added measure of defense for a target device against electronic hacking attacks. In addition, embodiments disclosed herein may provide ways to distinguish between benign and threatening events which may beset the target device.

Figure 1:
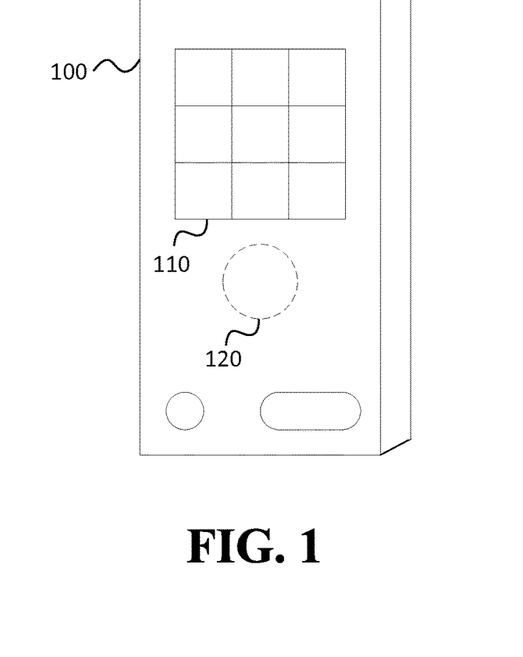
FIG. 1 shows a secured device according to an embodiment of the disclosed subject matter.

FIG. 1 shows an example secured, target device 100 including a user interface (UI) 110 and a motion detector 120 as disclosed herein. Device 100 may function in any role which includes a secured feature that is only intended to be accessible to authorized users. For example, device 100 may be part of a security system, for example, a controller for operating features of the system, such as locking/unlocking doors, enabling/disabling alarms, or setting modes of the system such as off, away, or specific modes for specific areas. As such, device 100 may include different operational states, such as a locked state in which no control features are accessible to the user and an unlocked state in which the control features are accessible to the user. In this example, protected control features, such as system control functions or alarm disarming/arming functions that are inaccessible in the locked state, would correspond to "secured features."

Device 100 is not limited to a particular physical or structural implementation. For example, device 100 may be implemented as a stand-alone mobile device or as part of a fixture attached to a wall or door. In some embodiments device 100 may be implemented by a multi-purpose mobile device, such as a cell phone, personal media player, tablet, laptop or the like. Device 100 may be configured to communicate wirelessly or via a wired connection with other systems that it controls or to which it provides access. In some embodiments, access to the system and data of device 100 may itself be the secure feature that is protected, e.g., a secured cell phone, personal media device, or tablet.

UI 110 is configured to receive an input of access credentials, such as a PIN, code, password, pass-shape, image-point code, trace code or the like, from a user seeking to access the secured features of device 100. UI 110 may be implemented by any electrical/mechanical component that allows for input from a user, for example, as a keypad, physical buttons on device 100, or a screen that displays an image or a virtual keypad on device 100.

At least a part of the security of device 100 may be enforced via the requirement of a correct input of access credentials via UI 110, for example, correct PIN entry on a keypad. Device 100 may exist in a locked state which cannot be unlocked unless the device 100 determines that, among other requirements, an authorized user is present and has physically inputted correct access credentials via UI 110.

Referring to a PIN-keypad (110) embodiment as shown in FIG. 1 for illustrative purposes, a hacker using electronic/software techniques to bypass physical PIN entry on device 100 may not need to touch the keypad 110 in a manner consistent with authorized entry of a PIN, or in some cases, not touch the keypad 110 at all. For example, the hacker may remove an outer casing of the device 100 and connect directly to internal circuitry, which allows the hacker to communicate directly with an internal processor that is configured to receive electrical signals corresponding to entry of digits on keypad 110. In another instance, the hacker might discover a vulnerability in a wireless communication of the device through which the hacker might inject malicious code that compromises the device 100.

On the other hand, an authorized user attempting to access the secure features of device 100 will physically touch the keypad 110 when entering the PIN, and may potentially do so in a repeatable and recognizable pattern. For example, if an authorized PIN includes the digits "19983026", the user entering the PIN may tap the digits in a consistently similar cadence. The user may tap the "99" digits slightly faster than the other digits, since this section of the PIN includes repeated digits. Or the user may be in the habit of tapping the entire PIN in a relatively slow pace. The user's cadence may be an unconsciously learned behavior that the user is unaware of but is unique to the user. On the other hand, the user's cadence may include a deliberately timed beat that the user purposefully intends to be a part of the user's identifying information, or a specific movement such as shake applied to the device at a certain moment during entry of the PIN.

Movement, cadence, impact or other types of motion information that may be obtained during entry of access credentials will hereinafter be referred to as "motion data." The device 100 may include a motion detector 120 to capture motion data. Detector 120 may be disposed on or within the device 100. Detector 120 may be implemented, for example, as an accelerometer, a shock detector, or strain gauges. Detector 120 may be calibrated to be sufficiently sensitive to detect an impact or minor shock experienced by the device 100 when a button, digit, or screen of UI 110 is physically pressed or tapped, as well as general movements such as shakes, swipes, tremors, etc., that may be applied to device 100 as a whole.

Figure 2:
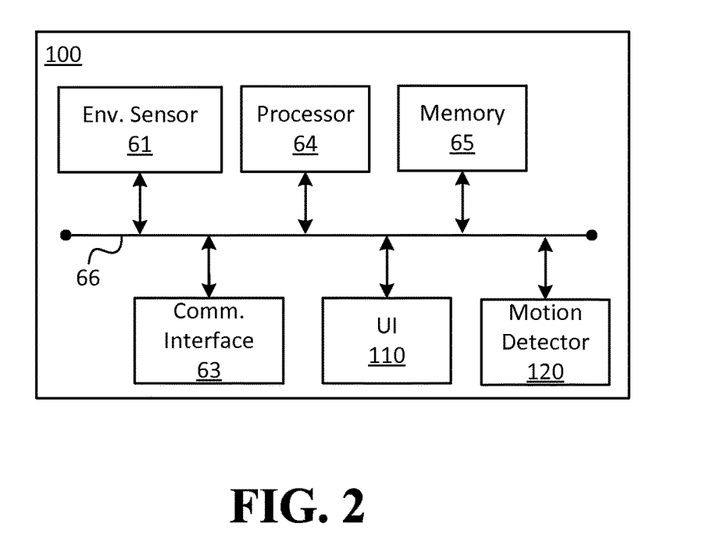
FIG. 2 shows a diagram of a secured device according to an embodiment of the disclosed subject matter.

FIG. 2 illustrates a diagram of an example device 100 as disclosed herein. Device 100 includes a UI 110 to receive user input and, in embodiments in which the UI 110 is implemented as a display screen, to output information to the user as well. Device 100 further includes a motion detector 120 to detect physical impact experienced by the device 100 and obtain motion data, a processor 64 to process data and execute applications to control the device 100, environmental sensors 61 to obtain information about the environment surrounding the device 100, a communications interface 63 to communicate with devices and systems external to device 100, an internal bus 66 to facilitate internal communication among the components of the device 100, and a memory 65 to store configuration settings, information data and application data.

Device 100 may include a security component to control access to secure features of the device 100. For example, when a user requests access to secured features of device 100, the security component may process the request and control the device 100 to determine whether the user will be granted access to the secure feature based on a combination of entry of access credentials and motion data.

Figure 3:
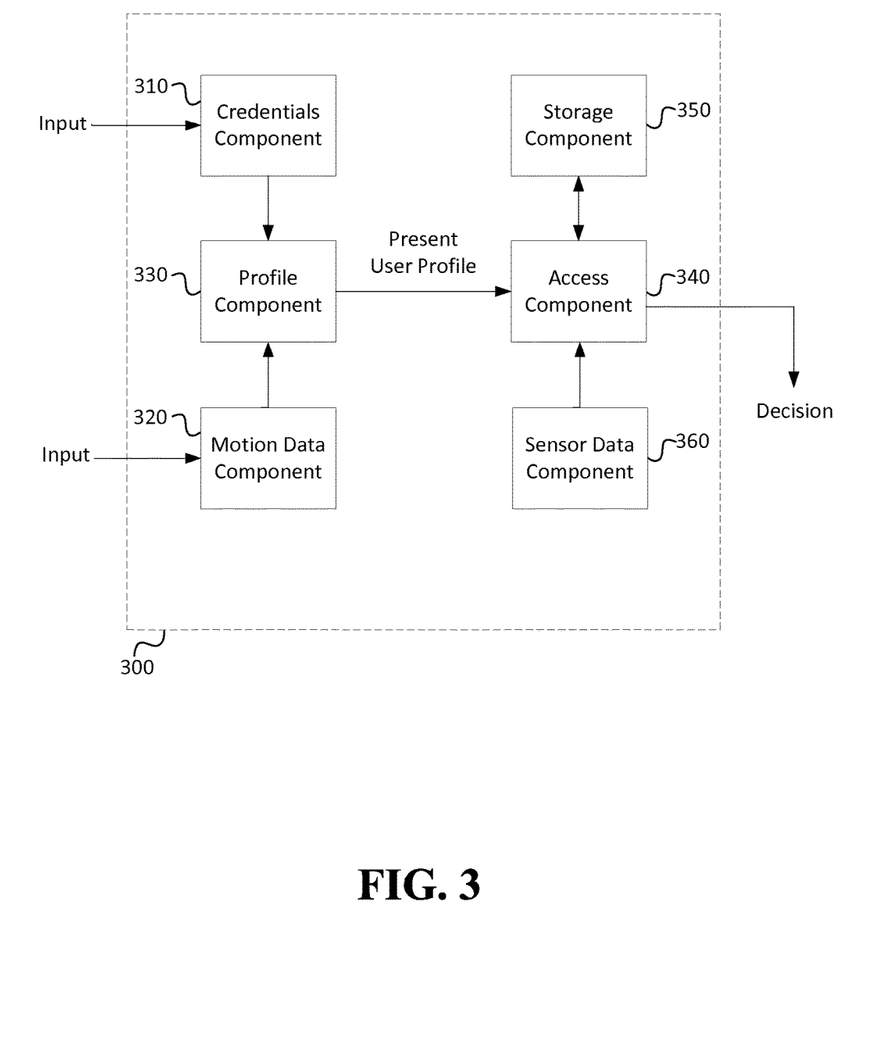
FIG. 3 shows a security component according to an embodiment of the disclosed subject matter.

FIG. 3 illustrates an embodiment of a security component 300 of device 100. Processor 64, memory 65, UI 110 and detector 120 may be used to implement security component 300, for example, through a combination of hardware (e.g., memory 65, processor 65, etc.), software (e.g., applications stored in memory 65 and executed by processor 65) and/or firmware. Moreover, a person of ordinary skill in the art would appreciate that various components described herein can include electrical circuit(s) that can include sub-components and circuitry elements of suitable function in order to implement the embodiments of the subject disclosure. Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

Security component 300 includes a credentials component 310 to receive access credentials from a user seeking to access secure features of device 100, a motion data component 320 to process motion data that is obtained during the input of the access credentials, a profile component 330 to create a present user profile by associating the motion data with the access credentials, an access component 340 to compare the present user profile with stored user profiles to determine whether the current user is an authorized user, a storage component 350 to manage storage and retrieval of user profiles, and an optional sensor data component 360 to provide sensor data to the access component 340.

The storage component 350 may control storage operations, for example, by maintaining a database of user profiles. The physical location of the stored profiles is not limited to a local storage within the device 100. For example, the storage component 350 may be configured to store profiles in a remote storage, such as a cloud-based server, accessible by the device 100 via wired or wireless communication.

When a user initiates a request to access a secured feature, security component 300 operates the credentials component 310 and the motion data component 320 to simultaneously receive inputted access credentials and capture motion data, respectively. Access credentials may include, for example, a PIN, password, security code or the like which is entered through UI 110 (FIG. 2). Motion data may include any impact or movement information obtained from the motion detector 120 (FIG. 2) during the entry of the credentials, or any lack of information obtained from the motion detector.

The request for access to secure features may be handled in any of a number of ways and may incorporate use of the UI 110 (FIG. 2) or a particular motion detectable by the motion detector (12). For example, the entry of the first credential digit may initiate the request for access to secured features and the entry of the last of a set number, e.g. seven digits, may mark completion of the required entry. In another example, a certain movement, such as a double tap, may initiate the request for access to secured features and the same or a different motion may mark completion of the required entry. As another example, the device may automatically determine when the user has provided a complete credential component and a matching motion data component has been detected, at which point it may provide access to the secured features of the device.

When an authorized user completes a request to access secured features of device 100, the user next physically enters credentials via UI 110 (FIG. 2), for example, by tapping digits on buttons, touching keys on a virtual keypad, turning a click wheel or some other form of data entry, thereby generating corresponding motion data. Credentials component 310 and motion data component 320 transmit the credentials information and the motion data to the profile component 330.

The profile component 330 associates the received motion data with the received credentials to create a present user profile. The present user profile captures both the access credentials that the present requesting user entered and the manner in which they were entered. The profile component 330 transmits the present user profile to the access component 340.

The access component 340 communicates with the storage component 350 to check the present user profile against stored, authorized user profiles. The authorized user profiles may be stored, for example, in a local storage such as memory 65 (FIG. 2) or in a remote storage, such as a cloud-based server. Depending on the configuration of security component 300, the storage component 350 may return a null find value or retrieve one or more authorized profiles that are potential matches for the present user profile.

A potential match may be defined based primarily on either the credentials or the motion data, with the remaining profile element serving as a confirming element. When the potential match is defined primarily on the credentials, then the access component 340 may designate any stored profile having credentials matching the received credentials as a potential match. In this format, the access component 340 may utilize any of a variety of matching algorithms, including a single profile match search or a multiple profile match search in order to process the access request.

For example, in a first example configuration of security component 300, the storage component 350 may store authorized profiles such that each valid credential corresponds to a single motion data value. In this configuration, the access component 340 will require a user that is requesting access to secured features to enter access credentials in a manner such that the corresponding motion data must match a specific, single authorized profile, or fall within a threshold error range thereof. If the requesting user enters correct credentials but the motion data does not match the authorized profile's motion data matching those credentials, then the access component 340 may take additional steps, such as, for example, request re-entry of the code if the motion data falls within a threshold range of comparison or directly deny access if the motion data falls outside of the threshold range of comparison.

In a second example configuration of security component 300, the storage component 350 may store multiple authorized profiles having common credential information but different corresponding motion data. For example, a common access code of "38175" may be entered with different motion cadences for different users. A first authorized user may enter the code relatively slowly with a deliberate pause after the first digit. A second authorized user may enter the same code relatively rapidly with a deliberate pause after the second digit. The access component 340 will grant either the first or second authorized user access to the secured features of device 100, but deny access to an unauthorized user who, for example, enters the correct code with a lengthy pause before the final digit, since this would result in a present user profile that does not match any authorized user profile.

As previously mentioned, in the first and second example configurations described above a match is primarily defined based on the access credentials. In other words, the access component 340 may designate any authorized profile having credentials matching the received credentials of the present user profile as a possible match for validating the present user profile as being authorized. However, even an authorized user may enter correct credentials with a variation in motion data. To minimize the chance of locking out an authorized user, security component 300 may take various steps, including an initial learning session, an extended learning mode, and a re-entry mode.

When a user first creates an authorized account or at any other suitable time, the device 100 may enter a learning mode. The device 100 may request the user to enter the correct access credentials repeatedly a number of times in order to receive the corresponding motion data repeatedly. Based on information received while in the learning mode, multiple valid motion data values may be obtained. These values may be used to improve the accuracy of an authorized user profile. For example, the authorized user profile may include each individual motion data value, may define an average value with a standard deviation range as valid, or may define as valid a range of motion data values that will encompass all of the values obtained during the initial learning session. In some embodiments, a user may instruct the device to enter or re-enter the learning mode so as to train or re-train the device, as described in further detail herein.

Even taking into account the measures of the learning mode, in the course of time an authorized user may still input credentials with corresponding motion data that does not fall within the valid range initially defined in the authorized user profile. To account for this, the security component 300 may include additional features, such as a re-entry mode and an extended learning mode, as described below.

To trigger re-entry mode, the security component 300 may first define threshold ranges of valid motion data. For example, as a setting the security component 300 may define a first threshold range and a second threshold range. The access component 340 may be configured to take certain actions when a present user profile falls outside of the valid range of a matching authorized profile, but within one of the threshold ranges.

Figure 4A:
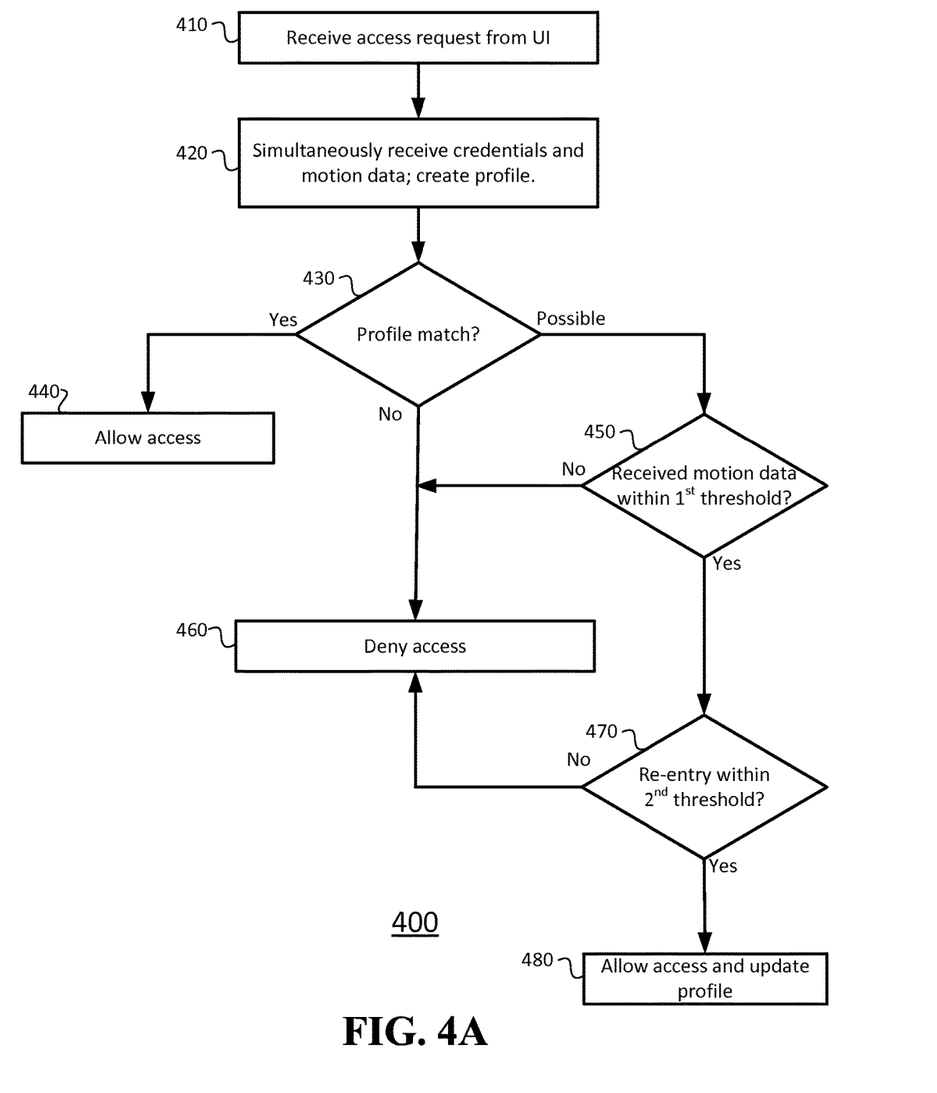
FIG. 4A shows a flowchart of a method of operating in re-entry mode and/or learning mode according to an embodiment of the disclosed subject matter.
Figure 4B:
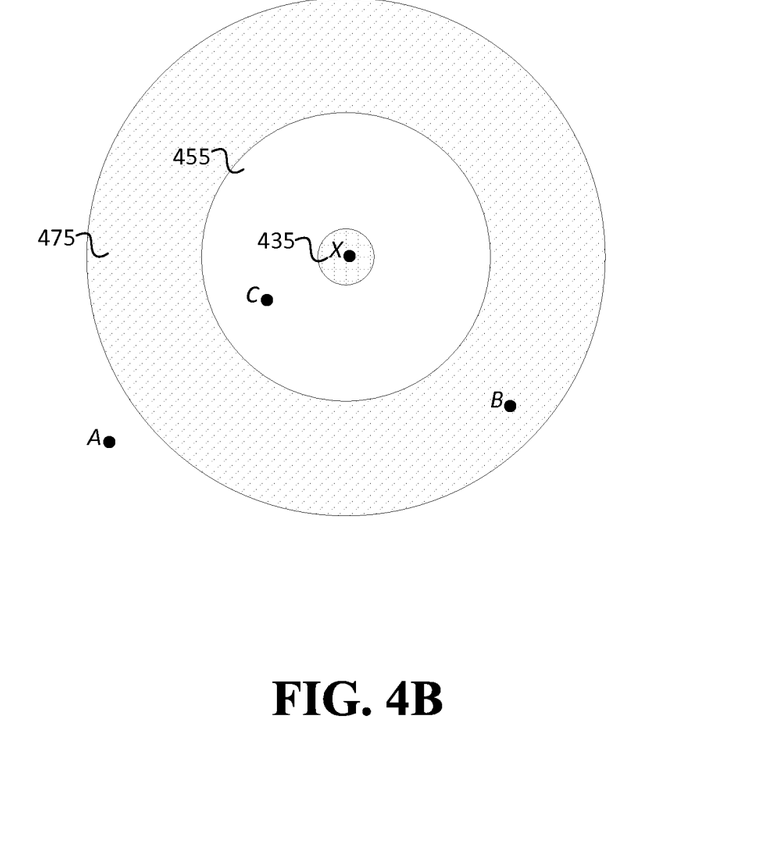
FIG. 4B shows a diagram of threshold ranges of motion data according to an embodiment of the disclosed subject matter.

FIG. 4A illustrates a flow chart 400 example of how a re-entry mode/extended learning mode may be triggered by security component 300. FIG. 4B illustrates a conceptual example of threshold ranges of motion data of an authorized user profile. An authorized user profile may include a valid motion data range 435, a first threshold range 475 greater than the valid motion data range 435, and a second threshold range 455 greater than the valid motion data range 435 but more narrow than the first threshold range 475. For the sake of simplification the motion data will be referred to as a value that may fall within or beyond any of the various ranges, such as values A, B, C, and X in FIG. 4B, however, it should be understood that the motion data may be more complex, such as in the form of multiple values, vectors, graphs, a matrix of values or the like, and the various ranges of the data may similarly be more complexly expressed. Similarly, multiple types of motion data may be considered a single "value," such as where a small movement of the device coincides with a vibration caused by a user interacting with a touch screen of the device and the combined motion data is considered a single value, which may be multi-dimensional.

Referring to FIGS. 4A and 4B, at operation 410 the device 100 receives a request by a user to access secure features. At operation 420 the access credentials and motion data are simultaneously received and used to create a present user profile. At operation 430, the security component 300 checks whether any authorized user profile exists that matches the present user profile.

A match between profiles may be defined as a full match, no match, or a possible match. In a full match, the present user profile credentials match the credentials found in an authorized user profile, and the present user motion data value X falls within a valid motion data range 435 of an authorized user profile. If a full match is found, then the user is granted access at operation 440.

A "no match" may be defined as the result when no authorized user profile can be found with credentials that match the received credentials of the present user profile. If no match is found, then access to the secured features is denied at operation 460.

If one or more authorized user profiles are found that include credentials that match the received credentials of the present user profile, these profiles may automatically be defined as "possible matches." At operation 450 the security component 300 determines whether the motion data of the present user profile falls within a first threshold range 475 of the motion data of any of the possible matches. If the motion data does not fall within any first threshold range, e.g., motion data value A, then access to the secured features may be denied at operation 460. For example, if no motion data is present at all, such as may be the case in a brute-force hack attempt, the lack of motion data would fall outside of first threshold range 475 and therefore may result in denial of access.

If the motion data does fall within a first threshold range 475 according to one or more authorized user profiles, e.g., motion data value B, then security component 300 may enter re-entry mode and the user is prompted to re-enter the credentials. The first threshold range 475 may be, by default, defined broadly enough to capture reasonable variation from motion data. However, as a configuration setting the threshold may be adjusted to capture a wider or narrower range in accordance with the user's comfort level and confidence in using the system of device 100.

The re-entry prompt may be provided through UI 110 (FIG. 2) and be configured to focus the user's attention on the task at hand such that the user more carefully enters the credentials. For example, the re-entry prompt may be accompanied by an audible or visual alert. At operation 470 the security component 300 determines whether the re-entered credentials is accompanied by motion data that falls within a second threshold range 455 of any authorized profile, e.g., motion data value C. The second threshold range 455 may be a narrower range than the first threshold range 475. It may be anticipated that the user is paying closer attention during re-entry, therefore more accurate results may be expected. If the re-entry of credentials is accompanied by motion data that falls outside of the second threshold range 455, the security component 300 may determine that the present user is not an authorized user, exit re-entry mode and deny access at operation 460. Although for ease of illustration only one re-entry opportunity is shown in the example provided in FIG. 4A, the user may be afforded two or more re-entry opportunities, with a total number of opportunities being a configuration setting that may be adjusted, for example, by an authorized user or an admin level user.

On the other hand, if the re-entry of credentials during re-entry mode at operation 470 is accompanied by motion data that falls within the second range 455 of an authorized user profile, e.g., motion data value C, the security component 300 may determine that the present user is an authorized user, exit re-entry mode and enter an extended learning mode.

In the extended learning mode the security component 300 may automatically update the authorized user profile based on the motion data obtained during the re-entry and allow access to the secured features at operation 480. For example, the current range of the authorized user profile may be expanded to a range that would encompass the re-entered motion data, or an amount equal to a fraction of the difference between the re-entered motion data and the former authorized user profile range. The security component 300 may further give the user the option to re-enter the credentials one or more times to recalibrate or adjust the valid motion data range 435 of the authorized user profile.

The first and second threshold ranges 475 and 455 may be based on the valid motion data range 435, but have ratios that are configuration settings that the user can adjust according to the user's comfort level and confidence in use of the system of device 100. For example, large threshold range ratios may be set when the user is new and feeling out the system and decreased as the user grows more comfortable.

The re-entry mode and extended learning mode may also be disabled or enabled in accordance with the user's preference. For example, the re-entry mode may be disabled while the extended learning mode remains enabled. In this configuration, any present user profile with credentials that match an authorized user profile and motion data that falls within the second threshold range 455 of the authorized user profile will be considered a match and the security component 300 will automatically update the authorized user profile valid motion data range 435. This setting could be preferable for implementing a constant, passive learning mode, such as when the motion data intended to be captured is expected to be more natural instead of deliberate.

As an alternative to the re-entry mode, the security component may request a different type of verification from the user. For example, when a user's entry of credentials results in a possible match of an authorized user profile, the security component may be configured to send an electronic message, such as an email or a text message, to a preset address or number associated with the authorized user profile. The electronic message may include a randomly generated credential for the user to enter in order to confirm that the user is the authorized user.

While the configurations and modes described above define a profile match primarily based on access credentials, in another embodiment the same configurations and modes may function by defining a profile match primarily based on motion data. Such an embodiment may provide a unique security layer by requiring a specific sequence of movements, such as shakes, taps or flips, with greater precision than the embodiments described above. In this embodiment the security component 300 may search for a match for a present user profile based on the range of motion data with little to no threshold buffer ranges to account for input variation. Instead, the accompanying credentials functioning as the confirming element may have a threshold range of error. For example, a configuration of this embodiment may include a threshold setting of single digit error for credentials entry. If a single digit of a PIN entry is incorrect, then the security component 300 may enter re-entry mode.

In any of the embodiments disclosed herein, the association of the access credentials and the motion data to create a present user profile may be handled in any of number of ways. For example, the temporal sequence of credentials entry and movement data may be captured through the use of recording timing data. In this manner, a time window may be allotted for entry of the credentials and the motion data. The motion data may capture movements that mark the timing of entry of the credentials within the window. An entry with correct credentials and movements, e.g., a shake after entry of the second digit, could be denied if the entry takes too long. In another example, the timing data may be disregarded and the association of credentials and motion data may instead be stored as data including certain movement "peaks". For example, the motion data of a particular user profile may only require that five taps and a sufficiently hard shake take place during the entry of a five digit PIN. Disregarding timing data, the sequence of the five taps and hard shake would not result in a denial of access as long as all of these peaks are inputted. That is, some embodiments may determine only that the appropriate movement data and credential data been received, without considering the order and/or timing in which they are each received.

Referring back to FIG. 2, device 100 may also include environmental sensors 61. Environmental sensors 61 could include, for example, a temperature sensor, motion sensor, proximity sensor, passive infrared (PIR) sensor, magnetic field sensor, radio frequency (RF) sensor, light sensor, microphone, or another type of environmental sensor that obtains or provides information about the environment that the device 100 is located in.

Referring to FIG. 3, security component 300 may use sensor data gathered from sensors 61 (FIG. 2) to augment the credentials and motion data by analyzing the data as indicative of whether an actual user is present. Sensor data component 360 may provide sensor data to the access component 340. When the device 100 receives a request for access to secured features, access component 340 may first check whether sensor data received from the sensor data component 360 indicates that a physical user is present. For example, sensor 61 may be implemented as an IR sensor that may be configured to provide information to check whether an actual person is near the device 100. This initial check may serve as an added security measure, for example, to screen hacking attempts which may attempt to access the device via wired or wireless communication using a virus, trojan horse, bot or the like.

In one embodiment, the device 100 may be part of a system, such as a smart home environment that includes several components having sensors and processors. The system's components can be electrical and/or mechanical, including intelligent, sensing, network-connected devices that communicate with each other and/or may communicate with a central server or a cloud-computing system to provide any of a variety of environment and/or security management objectives in a home, office, building or the like. Such objectives, which may include, for example, managing room temperature, managing door locks, managing building alarms, etc., will collectively be referred to as "premises management." A premises management system as described herein may further include subsystems that communicate with each other to handle different aspects of premises management, such as a security system component that controls alarms and security of the premises and a smart home component that controls environmental aspects such as light and temperature of the premises. The device 100 may operate as a control component that includes secure features, to which access is granted or denied as described above.

The device 100 may also receive data from the premises management system, for example, via communications interface 64 (FIG. 2). The individual hardware components of the premises management system that are configured to monitor and affect the premises in order to carry out premises management will hereinafter be referred to as "premises management devices." Premises management devices can include multiple physical hardware and firmware configurations, along with circuitry hardware (e.g., processors, memory, etc.), firmware, and software programming that are capable of carrying out the currently described methods and functions of a premises management system.

Figure 5:
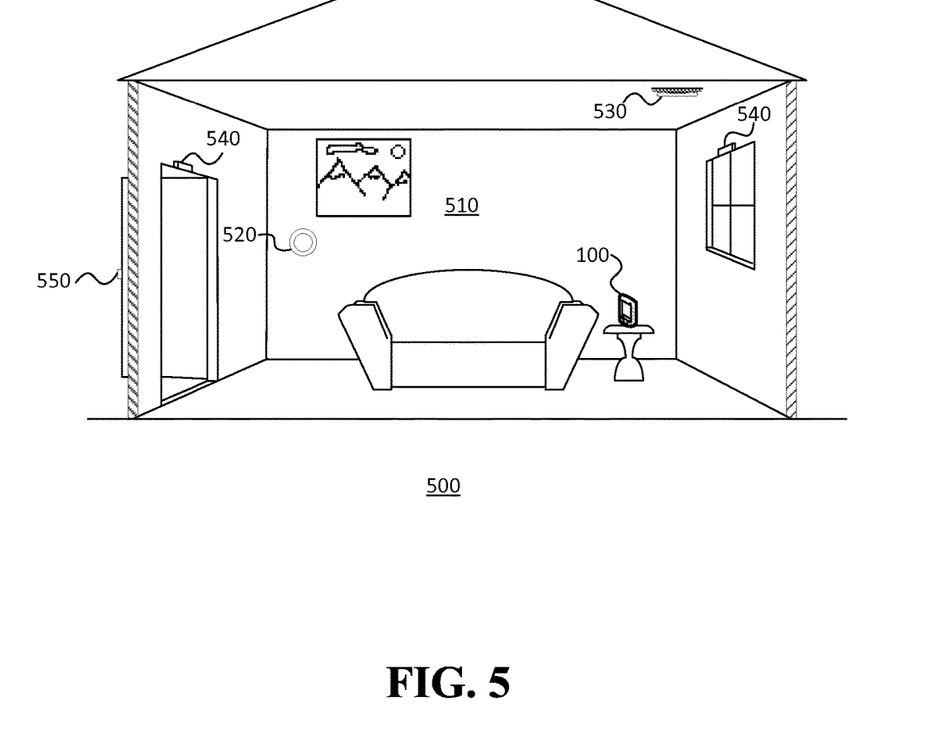
FIG. 5 shows a premises management system including a secured device according to an embodiment of the disclosed subject matter.

FIG. 5 shows an example premises management system 500 within a premises 510. In addition to control device 100, the system 500 may include multiple types of premises management devices, such as one or more intelligent, multi-sensing, network-connected thermostats 520, one or more intelligent, multi-sensing, network-connected hazard detection units 530, one or more intelligent, multi-sensing, network-connected entry detection units 540, and one or more network-connected door handles 550.

Premises management devices may include one or more sensors that provide data about the premises 510. In general, a "sensor" may refer to any device that can obtain information about its environment. A brief description of sensors with examples in the context of the system 500 follows. These examples are not intended to be limiting but are merely provided as illustrative subjects to help facilitate describing subject matter of the present disclosure. The system 500 is not limited to the types of sensors described below, but may employ these and other types of sensor. Sensors are known in the art and their deployment as described herein will be readily understood by one of ordinary skill on the art.

Sensors may be described by the type of information they collect. For example, sensor types may include motion, smoke, carbon monoxide, proximity, temperature, time, physical orientation, acceleration, location, entry, presence, pressure, light, and sound, sensors and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof.

A sensor also may be described in terms of a function or functions the sensor performs within the system 500. For example, a sensor may be described as a security sensor when it is used to determine security events such as unauthorized entry.

A sensor may be configured to operate for different functions at different times. For example, system 500 may use data from a motion sensor to determine how to control lighting in the premises 510 when an authorized user is present and use the data to trigger an alert of unauthorized or unexpected movement when no authorized user is present. In another example, the system 500 may use the motion sensor data differently when a premises alarm system is in a "stay" state versus an "away" state.

In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of system 500.

Sensors of system 500 may provide environment data and/or system data to device 100 via wired or wireless communication, for example, through a direct connection of a docking station or over Bluetooth®, Wi-Fi, near-field radio communication or the like. Environment/system data may provide a further indication of a present situation of the device 100. For example, sensors of system 500 may transmit environment data that indicates that no person is present in the room with the device 100. In this case, if the device 100 receives a request to access secure features, the device 100 may determine that the request is not from an authorized user and immediately deny the request without permitting the input of credentials. Similarly, re-entry mode and extended learning mode may be disabled when environment data indicates that no person is present in the room with the device 100.

In another example, the system 500 may transmit system data that indicates that the system 500 is a heightened state, such as a pre-alert state. In response, the device 100 may adjust to a heightened secure mode. For example, the first and second thresholds as described in flowchart 400 of FIG. 4A may be lessened or disabled such that the device requires a more accurate entry than normal.

In situations in which the systems/devices discussed here collect information which may be considered personal information about users, or may make use of personal information, the users may be provided with an opportunity to control whether programs or features collect user information (e.g., information about a user's actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 6:
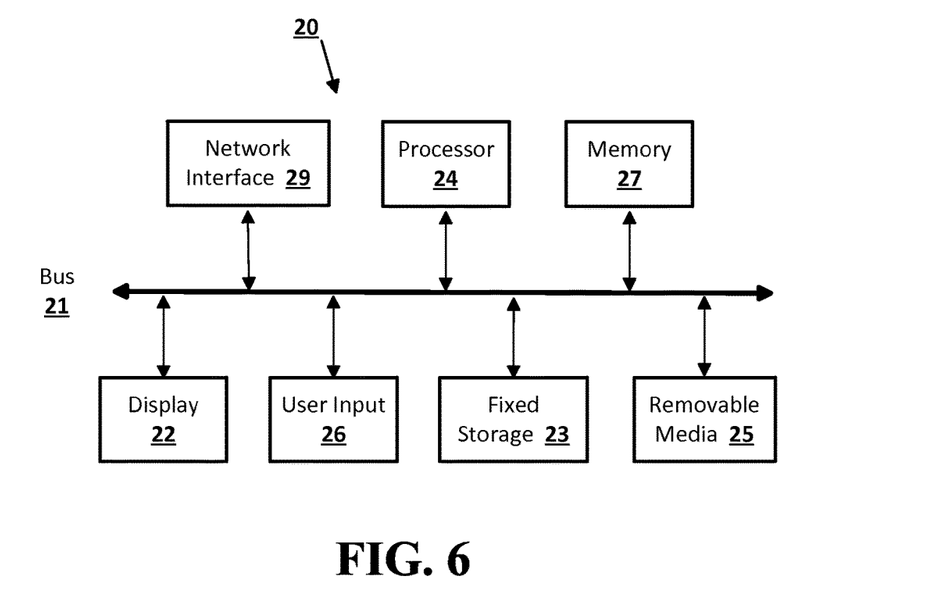
FIG. 6 shows a computing device according to an embodiment of the disclosed subject matter.

Embodiments of the presently disclosed subject matter may be implemented in and used with a variety of component and network architectures. FIG. 6 is an example computing device 20 suitable for implementing embodiments of the presently disclosed subject matter. The computing device 20 may have secured features to which access is granted or denied as described above. The computing device 20 may be, for example, a desktop or laptop computer, or a mobile computing device such as a smart phone, tablet, or the like. The computing device 20 may include a bus 21 which interconnects major components of the computing device 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computing device 20 are generally stored on and accessed via a computer readable medium, such as a hard disk drive (e.g., fixed storage 23), an optical drive, floppy disk, or other storage medium.

The fixed storage 23 may be integral with the computing device 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computing device such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
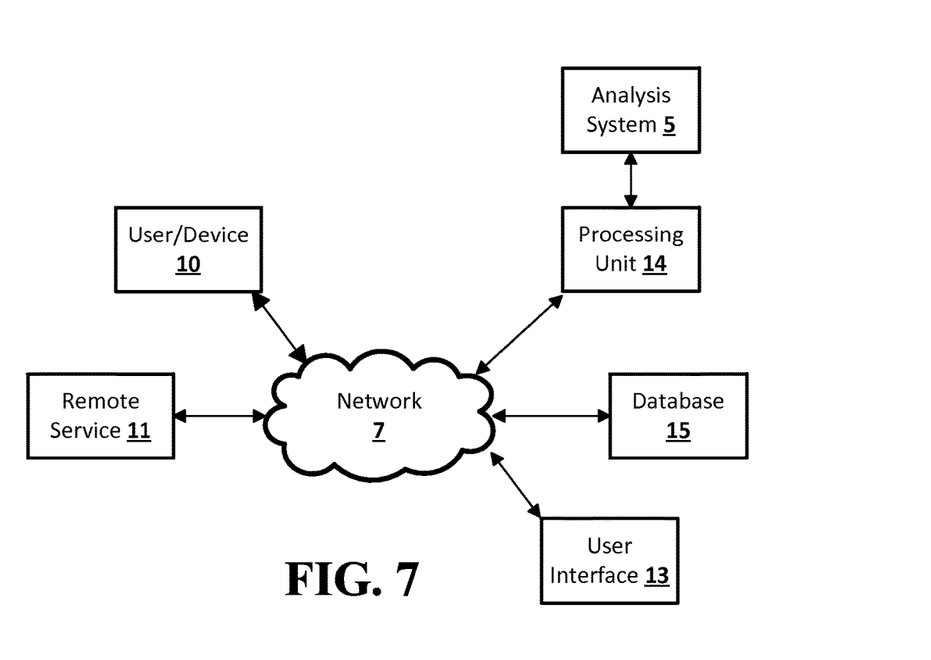
FIG. 7 shows an example network and system configuration according to an embodiment of the disclosed subject matter

FIG. 7 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   detecting, by a motion detector on a secured device, motion during entry of first access credentials by a user on a keypad on the secured device, the first access credentials selected from the group consisting of a personal identification number (PIN), a code and a password, wherein the motion detector is separate from the keypad and detects motion resulting from the entry of the first access credentials via the keypad;
   storing first motion data in association with the first access credentials, the first motion data indicating a pattern of the detected motion and of a cadence of the detected motion;
   granting access to a secured feature of the secured device upon receiving user access credentials matching the first access credentials accompanied by detected motion that produces user motion data matching the first motion data to a degree within a defined valid data range of the first motion data;
requiring a first re-entry of the user access credentials when the user motion data differs from the first motion data to a degree greater than the valid data range but less than a first threshold range that is larger than the valid data range;
denying the user access to the secured feature when the first re-entry results in motion data that falls outside of a second threshold range that is larger than the valid data range and smaller than the first threshold range; and
allowing the user access to the secured feature when the first re-entry results in motion data that falls inside of the second threshold range.

2. The method of claim 1, wherein the motion detector comprises a component selected from the group consisting of an accelerometer, a shock detector, and a strain gauge.

3. The method of claim 1, wherein the first motion data and the first access credentials are stored in a memory component disposed in the secured device.

4. The method of claim 1, wherein the first motion data and the first access credentials are stored in a cloud-based server.

5. The method of claim 1, further comprising adjusting the valid data range based on the first re-entry when the first re-entry results in motion data that falls within the first threshold range.

6. The method of claim 1, further comprising:
requesting a plurality of re-entries of the access credentials when the first re-entry falls within the second threshold range; and
adjusting the first threshold range based on motion data obtained from the plurality of re-entries.

7. The method of claim 1, further comprising denying access to the secured feature when the user motion data differs from the first motion data to a degree greater than the valid data range.

8. The method of claim 1, further comprising adjusting the first threshold based on the user motion data when the user access credential matches the first access credential but the user motion data falls outside of the first threshold range.

9. The method of claim 1, further comprising:
detecting whether a user is physically present near the secured device; and
denying access to the secured feature when user access credentials are received while no user is physically present.

10. A device having a secured feature designated to be accessible only to authorized users, the device including: a movement detector, a keypad separate from the movement detector, a memory that stores computer executable components, and a processor that executes the following computer executable components stored in the memory:
a credentials component to receive an input of access credentials entered on the keypad by a user, the access credentials selected from the group consisting of a personal identification number (PIN), a code and a password;
a motion data component to generate motion data from movements of the device detected by the movement detector resulting from entry of the access credentials via the keypad, the motion data further generated from a cadence of the movements of the device; and
an access component to determine whether the user is an authorized user based on the inputted access credentials and the generated motion and to deny access to the secured feature when the user is not an authorized user,
to require a first re-entry of the user access credentials when the user motion data differs from the first motion data to a degree greater than the valid data range but less than a first threshold range that is larger than the valid data range,
to deny the user access to the secured feature when the first re-entry results in motion data that falls outside of a second threshold range that is larger than the valid data range and smaller than the first threshold range, and
to allow the user access to the secured feature when the first re-entry results in motion data that falls inside of the second threshold range.

11. The device of claim 10, further comprising:
a profile component to create a present user profile using the inputted access credentials and the generated motion data; and
a storage component to store authorized user profiles that each include a corresponding authorized access credential and corresponding valid motion data range,
wherein the access component is configured to determine whether the user is an authorized user by determining whether the present user profile matches an authorized user profile.

12. The device of claim 11, wherein at least one valid motion data range is defined in an initial entry session during which the authorized user physically enters authorized access credentials two or more times.

13. The device of claim 10, wherein the access component is configured to adjust the valid motion data range corresponding to the authorized user profile when the re-entered access credentials are accompanied by movements that generate motion data that falls within the second threshold range.

14. A system, comprising:
a plurality of inter-connected devices, each including one or more sensors that generate data about an environment;
and a secured control device to control one or more operations of the system, the control device including:
a movement detector, a keypad separate from the movement detector, a memory that stores computer executable components, and a processor that executes the following computer executable components stored in the memory:
a credentials component to receive an input of access credentials entered on the keypad by a user, the access credentials selected from the group consisting of a personal identification number (PIN), a code and a password;
a motion data component to generate motion data from movements of the device detected by the movement detector resulting from entry of the access credentials via the keypad;
a communication component to receive sensor data about the environment of the control device from the plurality of inter-connected devices; and
an access component to determine whether the user is an authorized user based on the sensor data, the inputted access credentials and the generated motion data and to deny access to a secured feature when the user is not an authorized user,
to require a first re-entry of the user access credentials when the user motion data differs from the first motion data to a degree greater than the valid data range but less than a first threshold range that is larger than the valid data range, to deny the user access to the secured feature when the first re-entry results in motion data that falls outside of a second threshold range that is larger than the valid data range and smaller than the first threshold range, and to allow the user access to the secured feature when the first re-entry results in motion data that falls inside of the second threshold range.

15. The system of claim 14, wherein the access component is configured to deny acces to the secured feature when the sensor data indicates that no user is physically present.

16. The method of claim 1, further comprising transmitting, by the secured device, an electronic message to an address or a number associated with the user to request a user response to the electronic message, wherein granting access to the secured feature of the secured device is further based on receiving the user response to the electronic message to confirm that the user is an authorized user.

17. The method of claim 1, further comprising obtaining timing data for the entry of the first access credentials, wherein granting access to the secured feature of the secured device is further based on receiving timing data for the entry of the first access credentials that is within a valid range of timing data for the entry of the first access credentials.

18. The device of claim 10, wherein the computer executable components further comprise a communication component to transmit an electronic message to an address or a number associated with the user to request a user response to the electronic message, and wherein the determination of whether the user is an authorized user is further based on the user response to the electronic message to confirm that the user is an authorized user.

19. The device of claim 10, wherein the computer executable components further comprise a timing component to obtain timing data for the input of the access credentials, and wherein the determination of whether the user is an authorized user is further based on the timing data for the input of the access credentials.

20. The device of claim 10, wherein the movement detector comprises a component selected from the group consisting of an accelerometer, a shock detector, and a strain gauge.

21. The system of claim 14, wherein the communication component is further configured to transmit an electronic message to an address or a number associated with the user to request a user response to the electronic message, and wherein the determination of whether the user is an authorized user is further based on the user response to the electronic message to confirm that the user is an authorized user.

22. The system of claim 14, wherein the control device further includes a timing component to obtain timing data for the input of the access credentials, and wherein the determination of whether the user is an authorized user is further based on the timing data for the input of the access credentials.

23. The system of claim 14, wherein the movement detector comprises a component selected from the group consisting of an accelerometer, a shock detector, and a strain gauge.

24. The method of claim 17, further comprising: denying access to the secured feature if the timing data for the entry of the first access credentials indicates that the first access credentials are entered outside the valid range of timing data.

25. The device of claim 19, wherein the access component is configured to deny access to the secured feature if the timing data for the input of the access credentials indicates that the access credentials are inputted outside a valid range of timing data.

26. The system of claim 22, wherein the access component is configured to deny access to the secured feature if the timing data for the input of the access credentials indicates that the access credentials are inputted outside a valid range of timing data.

* * * * *